United States Patent [19]

Crighton et al.

[11] Patent Number: 5,527,601

[45] Date of Patent: Jun. 18, 1996

[54] BIAXIALLY ORIENTED POLYPROPYLENE FILM

[75] Inventors: Allan J. Crighton; Helen A. Biddiscombe, both of Somerset, England; Didier Jupont, Mantes-la-Jolie, France

[73] Assignee: Courtaulds Films (Holdings) Limited, England

[21] Appl. No.: 192,611

[22] Filed: Feb. 7, 1994

[30] Foreign Application Priority Data

Feb. 6, 1993 [GB] United Kingdom ............... 9302365

[51] Int. Cl.$^6$ ............................... B32B 3/26; B32B 27/08
[52] U.S. Cl. .................... 428/316.6; 428/516; 428/910; 428/323; 264/177.19
[58] Field of Search ..................... 425/516, 910, 425/316.6, 323

[56] References Cited

U.S. PATENT DOCUMENTS

| 4,560,614 | 12/1985 | Park | 428/317 |
| 5,091,236 | 2/1992 | Keller et al. | 428/213 |
| 5,178,942 | 1/1993 | Frognet et al. | 428/317.9 |

FOREIGN PATENT DOCUMENTS

| 0083495 | 7/1983 | European Pat. Off. | B44F 9/10 |
| 0312289 | 4/1989 | European Pat. Off. | B32D 27/20 |
| 0312226 | 4/1989 | European Pat. Off. | B54D 65/40 |
| 0545650 | 6/1993 | European Pat. Off. | B32B 27/32 |
| 0546741 | 6/1993 | European Pat. Off. | B32B 27/32 |
| 2262063 | 6/1993 | United Kingdom | B32B 27/32 |
| 2262062 | 6/1993 | United Kingdom | B32B 27/32 |
| WO93/04860 | 3/1993 | WIPO | B32B 27/18 |

*Primary Examiner*—P. C. Sluby
*Attorney, Agent, or Firm*—Bacon & Thomas

[57] ABSTRACT

Biaxially oriented polypropylene films having a core layer of voided polypropylene homopolymer with a layer of non-voided polypropylene homopolymer on one surface thereof and an outer, printable layer on the non-voided layer, the core layer and/or the said non-voided layer including titanium dioxide. Such films can be used to produce labels, for example with densities in the range 0.55 to 0.80 despite the presence of the titanium dioxide.

8 Claims, No Drawings

BIAXIALLY ORIENTED POLYPROPYLENE FILM

This invention concerns polymeric films and especially polymeric films for producing labels.

The use of polymeric films to produce labels has been increasing in recent years. Labels produced from polymeric films have a number of advantages, for example compared with paper labels. In particular labels produced from polymeric films can be applied to articles by the so-called in-mold labelling technique in which a pre-formed and usually pre-printed polymeric film label is introduced into a mold prior to the article being molded in the mold, for example by injection molding or blow molding, so that the label forms an integral part of the surface of the article.

Self-adhesive labels produced from polymeric films have also found wide acceptance, such labels often being presented on a strip of material having a release surface from which the labels can be peeled as required.

A number of proposals have been made hitherto for the types of polymeric films which can be used to form labels, biaxially oriented films based on propylene polymers having found wide acceptance for the purpose due to their inherent properties, for example stiffness combined with printability and the ability to adhere to molded polypropylene articles during in-mold labelling. In addition, polymeric films used to produce labels can be transparent or opaque, as desired.

An example of a hitherto proposed opaque polypropylene film for use in producing labels consists of a relatively thick core layer of a voided propylene homopolymer with relatively thin layers of a non-voided polymer on either side of the core layer, voiding of the core having been achieved by biaxially stretching the film with a phase-distinct particulate material, e.g. chalk, in the core layer. The voids in the core provide these films with opacity, and the non-voided outer layers provide them with printability and/or the ability to adhere to articles as the articles are being molded. Such films are in essence identical to packaging films as are proposed, for example, in EP-0004633-A, but they will usually be used at considerably greater thicknesses. Thus whereas packaging films are often used at thicknesses of about 30 µm, films used for labelling are often in excess of 50 µm thick in order to achieve the desired stiffness to facilitate application of the labels to articles which are to be labelled.

Although the use of a voiding agent does impart opacity to voided films, the films are often not sufficiently opaque for some end uses, for example in-mold labels on highly opaque articles where it is desired that the background of a printed label should merge into the surface of the labelled article so that the edge of the label is difficult if not impossible to see with the naked eye. This has led to the use of highly opaque fillers, and especially titanium dioxide, the particle size of the titanium dioxide generally being too small to effect voiding.

In order to provide voided polypropylene films with high surface gloss, it has been proposed hitherto to use not only an outer, non-voided printable layer, but a further non-voided layer, for example of a propylene homopolymer, between the outer layer and the voided core. It is believed that this non-voided layer improves the surface gloss of the films by masking the effect of the surface irregularities on the voided layer caused by the voiding agent disrupting the surface of the voided layer. However, although the surface gloss of a voided film can be improved by such a technique, the films have inadequate opacity for many end uses.

According to the present invention there is provided a biaxially oriented polypropylene film comprising a core layer of voided polypropylene homopolymer with a layer of non-voided polypropylene homopolymer on one surface thereof and an outer, printable layer on the non-voided layer, the core layer and/or the said non-voided layer including titanium dioxide.

The titanium dioxide can be present in the non-voided layer and not in the core layer, in the core layer and not in the non-voided layer, or it can be present in both layers. It has, however, been surprisingly found that particularly high opacity can be achieved by the titanium dioxide being present in only one of these layers. Furthermore, the use of a voided core layer enables films of the present invention to be produced having densities in the range of from 0.55 to 0.80 despite the presence of the titanium dioxide, thereby giving a high yield of film for a given amount of polymer combined with high opacity.

The amount of titanium dioxide used in the layer or layers in which it is present should be sufficient to impart the desired level of opacity. In general this can be achieved by the use of up to 20 percent of titanium dioxide based on the weight of the particular layer in which it is present, and preferably in the range of from 3 to 15 percent by weight of such layers.

It should also be appreciated that high surface gloss can be achieved with such films whether the titanium dioxide is present in the core layer or the non-voided layer.

The outer, printable layer is preferably a layer of a polyolefin, particularly preferred polyolefins containing units derived from two or more of ethylene, propylene, but-1-ene and higher alpha-olefins. The printability of polyolefin layers can be increased by known methods, for example by corona discharge treatment or flame treatment.

The surface of the core layer of films of the present invention opposite that having the non-voided layer and the outer, printable layer will usually have at least one further polymeric layer thereon. In a particularly preferred embodiment of the present invention this further polymeric layer has a matt surface which reduces blocking of the printable layer thereto, thereby reducing the tendency of labels produced from such films from sticking together when one is drawn from a stack of labels, for example by suction on the printable surface of the labels.

A matt surface can be achieved by a variety of techniques, but it is preferably achieved by the use of a blend of incompatible polymers which form separate phases when mixed. Examples of such blends are described for the writeable layer of films described and claimed in EP-0312 289-A.

When a blend of incompatible polymers is used to achieve a matt surface for the further layer, the further layer will usually be at least 1.5 µm thick, although it is generally preferred that such further layers should be not more than 5 µm thick, a preferred thickness range being from 2 to 5 µm. As will be appreciated, as the thickness of the further layer is increased, the degree of voiding of the core required to produce a film with a particular density will have to be increased.

In another preferred embodiment of the present invention, the surface of the core layer opposite that having the non-voided and outer, printable layers thereon has a heat sealable layer having a low heat seal threshold. By selecting the polymer or polymers of this heat sealable layer to have a low heat seal threshold, films of the present invention can be used to produce labels which can be applied to articles during molding operations using lower temperatures and pressures than are used in injection molding, for example thermoforming or blow molding, thereby achieving good adhesion to the articles without the use of a hot melt adhesive or a lacquer. Such layers are preferably from 0.5 to 2.0 μm thick.

Films of the present invention are particularly preferred for use in the production of labels. They therefore preferably have a thickness of from 60 to 90 μm, films with a matt surface, which can be used with advantage in in-mold labelling of injection moldings, preferably have a thickness of about 80 μm, whereas films with a surface having a low heat seal threshold preferably have a thickness of about 70 μm.

The thickness of the non-voided layer is preferably from 3 to 10 μm, and the thickness of the outer, printable layer is preferably from 0.5 to 2 μm.

The core layer of voided propylene homopolymer will usually represent the balance of the total film thickness, although as will be appreciated this will not be the case if other, optional layers are present, for example between the core layer and either a matt or low heat seal threshold further layer.

Films in accordance with the present invention can be produced by known methods, it generally being preferred to coextrude melts of the polymers for the respective layers through slot dies to form a multi-layer polymer web which is then sequentially stretched. Subsequently, one or both outer surfaces of the films can be treated to increase their surface energy, for example by corona discharge treatment or flame treatment.

Films in accordance with the present invention can, if desired, include one or more additives in one or more of the layers, for example anti-block agents, antistatic agents, anti-oxidants and slip agents.

The following Example is given by way of illustration only. All melt flow index values are measured under ASTM D 1238/73 (condition L).

EXAMPLE

A four-layer polymeric web was produced by coextruding through a slot die a layer of substantially isotactic propylene homopolymer containing 9 percent by weight of calcium carbonate of 3.5 μm mean particle size with a blend of 32.5 percent by weight of polyethylene having a melt flow index of 0.12 g/10 min and 67.5 percent by weight of a copolymer of ethylene and propylene (4 percent units derived from ethylene) having a melt flow index of 8 g/10 min on one side and on the other side a layer of substantially isotactic polypropylene homopolymer containing 14 percent by weight of titanium dioxide and an outer layer of a propylene/ethylene copolymer containing 4 percent by weight of units derived from ethylene.

The resulting web was cooled on a chill roller and then heated by passing it over heated rollers rotating at different peripheral speeds to effect stretching of the web in the direction of extrusion. Thereafter the web was stretched in the transverse direction while heating the web in a stenter oven.

The biaxially stretched film produced was then cooled, corona discharge treated on both surfaces, and wound up.

The film had a total thickness of 80 μm, the layer of the polymer blend being 4 μm, the layer of titanium dioxide-containing homopolymer being 8 μm, and the outer layer of the propylene/ethylene copolymer being 1 μm. The layer of homopolymer containing the calcium carbonate had developed voids as a result of the stretching and it formed the balance of the total film thickness. The film had a density of 0.62.

The film had high opacity and following printing of the printable surface, cutting into labels and stacking for in-mold labelling, the individual labels separated well from each other when removed from the stack by the application of suction to the printed surface. The labels also behaved satisfactorily when applied as an in-mold label to an injection molded pot.

The labels could also be removed individually from the stack by sliding.

We claim:

1. A biaxially oriented polypropylene film comprising a core layer of voided polypropylene homopolymer; said core layer having first and second surfaces with a layer of non-voided polypropylene homopolymer on said first surface thereof and an outer, printable layer on the non-voided layer, and a polymeric layer on said second surface of said core layer, said polymeric layer having a mat surface; the core layer and/or the said non-voided layer including titanium dioxide as a component thereof and said voided polypropylene homopolymer containing chalk as a voiding agent.

2. A film according to claim 1, wherein the core layer contains titanium dioxide and the said non-voided layer is substantially free of titanium dioxide.

3. A film according to claim 1, wherein the said non-voided layer contains titanium dioxide and the core layer is substantially free of titanium dioxide.

4. A film according to claim 1, wherein each layer which includes titanium dioxide as a component thereof contains titanium dioxide in an amount which is up to 20 weight percent based upon the weight of the layer containing said titanium dioxide.

5. A film according to claim 4, wherein the titanium dioxide is present in an amount of from 3 to 15 percent by weight of the layers in which it is present.

6. A film according to claim 1, wherein said further polymeric layer comprises a blend of incompatible polymers which effects said matt surface.

7. A film according to claim 1, wherein the said further polymer layer has a heat seal threshold which is sufficiently low so that said film can be heat sealed to an article formed in an injection molding process without the use of hot melt adhesive or a lacquer.

8. A film according to claim 1, wherein at least one outer surface has been treated to increase the surface energy thereof.

* * * * *